US009316345B2

(12) United States Patent
Tarnay

(10) Patent No.: US 9,316,345 B2
(45) Date of Patent: Apr. 19, 2016

(54) DOUBLE BALL JOINT LOCKING DEVICE

(71) Applicant: Matthew Tarnay, Torrance, CA (US)

(72) Inventor: Matthew Tarnay, Torrance, CA (US)

(*) Notice: Subject to any disclaimer, the term of this patent is extended or adjusted under 35 U.S.C. 154(b) by 192 days.

(21) Appl. No.: 14/299,980

(22) Filed: Jun. 9, 2014

(65) Prior Publication Data

US 2015/0354745 A1     Dec. 10, 2015

(51) Int. Cl.
| | |
|---|---|
| *F16M 11/02* | (2006.01) |
| *F16M 11/14* | (2006.01) |
| *G06F 1/16* | (2006.01) |
| *F16M 11/20* | (2006.01) |
| *F16M 11/28* | (2006.01) |
| *F16M 13/02* | (2006.01) |
| *A47F 5/00* | (2006.01) |
| *A47F 7/00* | (2006.01) |
| *F16M 11/00* | (2006.01) |
| *F16M 13/00* | (2006.01) |
| *A47G 29/00* | (2006.01) |
| *E04G 25/00* | (2006.01) |
| *F16C 11/06* | (2006.01) |
| *F16C 11/00* | (2006.01) |
| *F16M 11/06* | (2006.01) |

(52) U.S. Cl.
CPC ............ *F16M 11/14* (2013.01); *F16M 11/2078* (2013.01); *F16M 11/28* (2013.01); *F16M 13/022* (2013.01); *G06F 1/1626* (2013.01); *F16C 11/06* (2013.01); *F16M 11/06* (2013.01); *Y10T 403/32032* (2015.01)

(58) Field of Classification Search
CPC ............... Y10T 403/32032; Y10T 403/32631; Y10T 403/32196; Y10T 403/32254; Y10T 403/32311; Y10T 403/32827; F16M 11/14; F16M 11/2078; F16C 11/106; F16C 11/06
USPC ........... 248/125.8, 125.9, 206.3, 288.31, 351, 248/354.1, 354.3, 354.4, 181.1; 403/56, 76, 403/90, 114, 122, 167
See application file for complete search history.

(56) References Cited

U.S. PATENT DOCUMENTS

| | | | | |
|---|---|---|---|---|
| 1,661,772 | A * | 3/1928 | Sanford .................. | B60T 11/04 188/194 |
| 3,375,044 | A * | 3/1968 | Peterson .................. | B25G 3/38 16/429 |
| 4,541,422 | A * | 9/1985 | de Zbikowski ...... | A61B 17/645 403/167 |
| 5,187,744 | A * | 2/1993 | Richter ............... | B60R 11/0241 224/553 |
| 5,419,522 | A * | 5/1995 | Luecke ................. | F16C 11/106 248/288.51 |
| 5,642,956 | A * | 7/1997 | Hale ....................... | F16F 15/08 403/122 |
| 6,017,010 | A * | 1/2000 | Cui ....................... | F16C 11/106 248/181.1 |
| 6,500,177 | B1 * | 12/2002 | Martinelli .......... | A61B 17/6458 606/54 |
| 7,364,125 | B2 * | 4/2008 | Speggiorin ............. | F16M 11/14 248/181.1 |
| 7,568,672 | B2 * | 8/2009 | Ferrer .................... | F16M 11/14 248/229.1 |

(Continued)

*Primary Examiner* — Syed A Islam
*Assistant Examiner* — Taylor Morris
(74) *Attorney, Agent, or Firm* — Clement Cheng

(57) ABSTRACT

A double ball joint locking device has a first ball socket mounted to a first telescopic member. The first ball socket has a first ball. A second ball socket is mounted to a second telescopic member. The second ball socket has a second ball. The first telescopic member has a telescopic connection with the second telescopic member such that the length of the double ball joint locking device is adjustable. A first ball locking rod is threadedly mounted to a first ball socket base at a first threaded mounting. A second ball locking rod is threadedly mounted to a second ball socket base, at a second threaded mounting. The second threaded mounting has an opposite handed orientation to the first threaded mounting. A first ball locking rod to second ball locking rod connection glidingly connects the first ball locking rod to the second ball locking rod.

17 Claims, 3 Drawing Sheets

(56) References Cited

U.S. PATENT DOCUMENTS

| | | | |
|---|---|---|---|
| 7,753,330 B2 * | 7/2010 | Brief | B60R 11/0241 248/278.1 |
| 2005/0281610 A1 * | 12/2005 | MacLean | F16C 7/026 403/56 |
| 2007/0034753 A1 * | 2/2007 | Lee | B60R 11/0241 248/121 |

* cited by examiner

DOUBLE BALL JOINT LOCKING DEVICE

FIELD OF THE INVENTION

The present invention is in the field of locking devices.

DISCUSSION OF RELATED ART

Use of electronic devices such as cameras and tablets may require a stand or tripod. Locking devices can secure stands and tripods. Traditionally, a variety of different locking devices have required independent engagement of joint locking.

A variety of different locking devices have been developed for tablet computers. Many of these are disclosed in the patent literature, such as, Tablet Computer Holder and Support by inventor Kobal in U.S. Pat. No. 8,235,334 issue of Aug. 7, 2012 the disclosure of which is incorporated herein by reference. Kobal discloses a foldable support for a tablet computer or other object as an upright, self-standing or anchorable device. The support includes a body with a recessed portion into which the base is attached about a horizontal axle to enable rotation.

Some of these locking devices are compatible with use in a vehicle. Reda et al. provides a mounting arm with multiple ranges for easy viewing of the mounted electronic component for occupants in the front and rear positions of the vehicle in U.S. publication 2013/0256478 published Oct. 3, 2013 entitled Mounting Arm for Tablet Computer, the disclosure of which is incorporated herein by reference.

Rossini in U.S. Pat. No. 7,274,564 issued Sep. 25, 2007 entitled Locking Cradle for Tablet Computers, the disclosure of which is incorporated herein by reference, discloses a cradle for supporting and retaining a tablet computer having four sides, a front, and a back. Rossini suggests the sides and projecting arms are selectively engagable to retain the tablet computer in the cradle.

Some locking devices also have dual purposes. Su et al. in U.S. publication 2013/0107449 published May 2, 2013 entitled Tablet Computer Enclosure, the disclosure of which is incorporated herein by reference, discloses a tablet computer enclosure that functions in combination with a table computer. Su et al. discloses a tablet computer enclosure that includes an electrical power distribution and charging circuit that allows power to be applied to the table computer via the table computer enclosure.

A variety of different ornamental and structural designs for locking devices can be adopted. One example is the design for a Mount for Tablet Computer, U.S. Pat. No. D676,451 issued Feb. 19, 2013 to Stanek et al., the disclosure of which is incorporated by reference. Stanek et al. discloses a device for mounting a table computer.

SUMMARY OF THE INVENTION

A double ball joint locking device has a first ball socket mounted to a first telescopic member. The first ball socket has a first ball. A second ball socket is mounted to a second telescopic member. The second ball socket has a second ball. The first telescopic member has a telescopic connection with the second telescopic member such that the length of the double ball joint locking device is adjustable. A first ball locking rod is threadedly mounted to a first ball socket base at a first threaded mounting. A second ball locking rod is threadedly mounted to a second ball socket base, at a second threaded mounting. The second threaded mounting has an opposite handed orientation to the first threaded mounting. A first ball locking rod to second ball locking rod connection glidingly connects the first ball locking rod to the second ball locking rod. The first ball locking rod is configured to transmit and receive rotation with the second ball locking rod. A locking lever is mounted to either the first ball locking rod or the second ball locking rod, and the locking lever has a lock position and an open position.

The double ball joint locking device optionally includes a tablet holder connected to the first ball extension shaft formed on the first ball. Preferably, a clamp is connected to the a second ball extension shaft formed on the second ball. The double ball joint locking device may also have a first ball contact where the first ball abuts the first ball locking rod and a second ball contact where the second ball abuts the second ball locking rod. A locking lever can be held in a locking lever depression when the locking lever is in the locked position. Also, the locking lever tip is mounted to the locking lever shaft.

A first ball contact is located where the first ball abuts the first ball locking rod and a second ball contact is located where the second ball abuts the second ball locking rod. The first ball contact includes a first ball socket plate spring abutting a first ball socket plate. The second ball contact includes a second ball socket plate spring abutting a second ball socket plate. A telescopic locking member is configured to engage an inside surface of the double ball joint locking device when the locking lever is rotated from the open position to the lock position. The telescopic locking member has a first telescopic locking part and a second telescopic locking part that both or singularly engage with an internal sidewall of the outside telescopic member.

Figure 1:
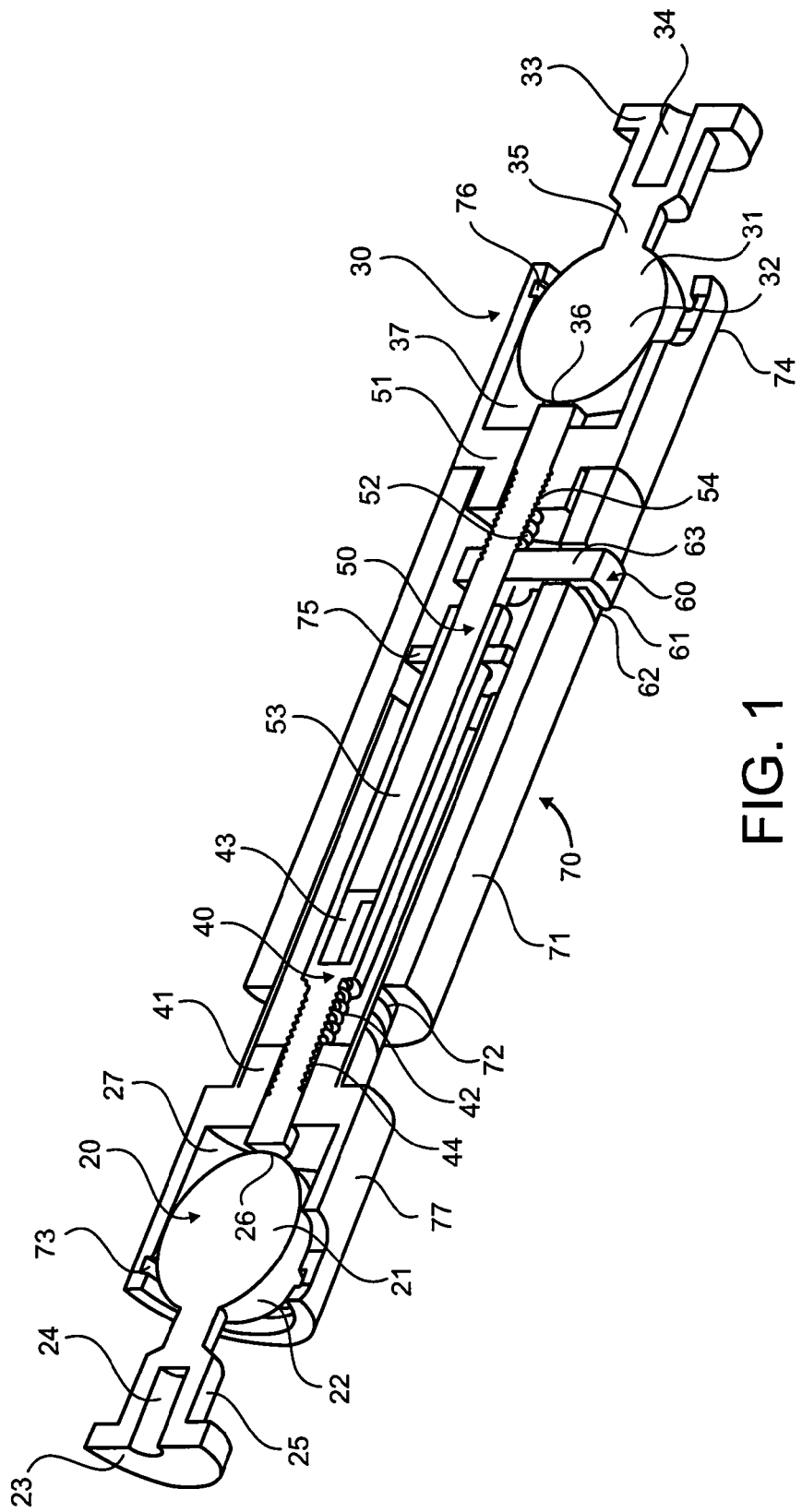
FIG. 1 is a perspective view cross section of the present invention.
Figure 2:
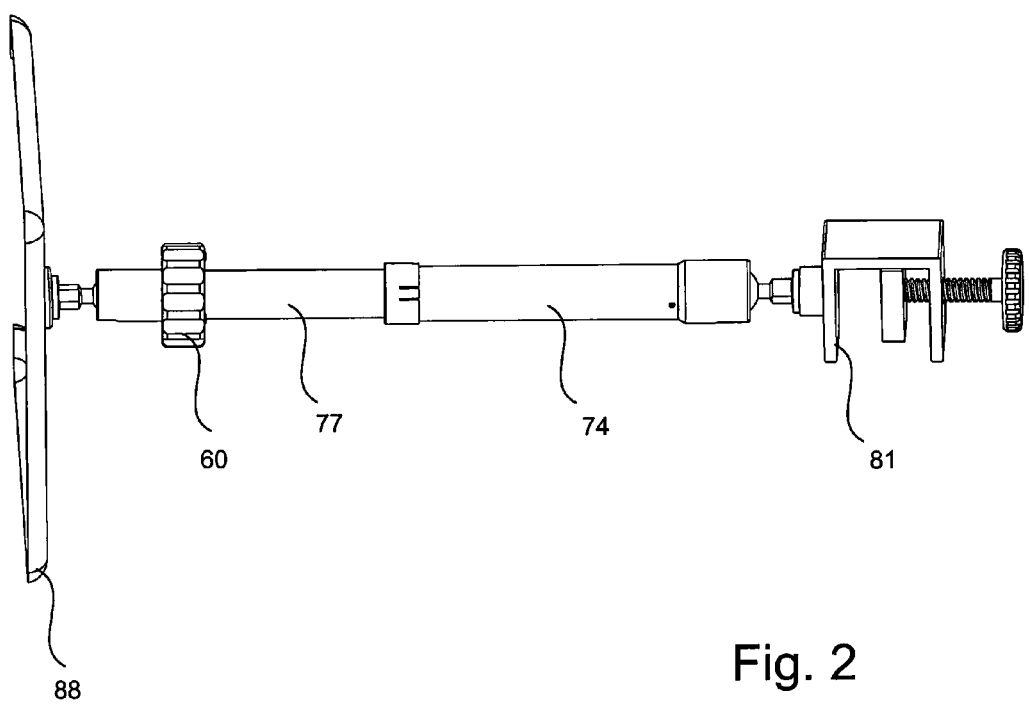
FIG. 2 is a perspective environmental view showing the tablet holder and clamp.
Figure 3:
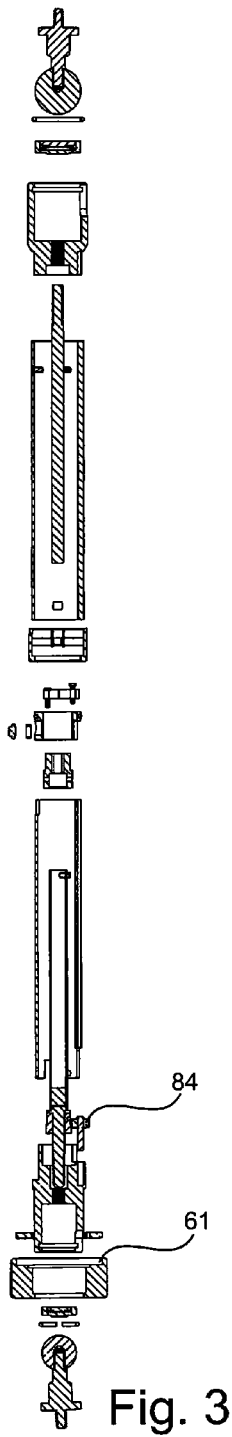
FIG. 3 is an exploded side view cross section of the present invention.
Figure 4:
FIG. 4 is an exploded side view of the present invention.
Figure 5:
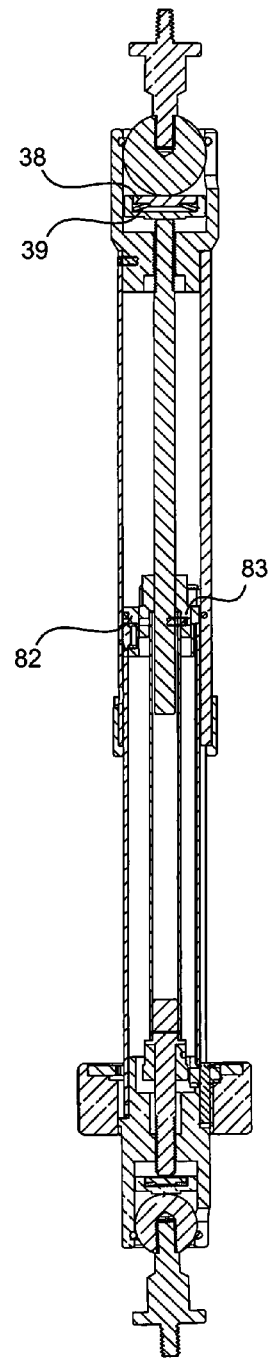
FIG. 5 is an assembled cross section of the present invention.

The following list of elements can be a useful guide in referencing the elements of the drawings.
20 First Ball Socket
21 First Ball
22 First Ball Surface
23 First Ball Extension Flange
24 First Ball Extension Opening
25 First Ball Extension Shaft
26 First Ball Contact
27 First Ball Socket Cavity
30 Second Ball Socket
31 Second Ball
32 Second Ball External Surface
33 Second Ball Extension Flange
34 Second Ball Extension Opening
35 Second Ball Extension Shaft
36 Second Ball Contact
37 Second Ball Socket Cavity
38 Second Ball Socket Plate
39 Second Ball Socket Plate Spring
40 First Ball Locking Rod
41 First Ball Socket Base
42 First Ball Locking Rod Thread
43 Shaft Cavity 44 First Ball Socket Base Thread
50 Second Ball Locking Rod
51 Second Ball Socket Base
52 Second Ball Locking Rod Thread
53 Shaft Cavity Key
54 Second Ball Socket Base Thread
60 Locking Lever
61 Locking Lever Tip
62 Locking Lever Depression
63 Locking Lever Shaft
70 Main Body
71 Main Body Surface
72 Telescopic Connection
73 First Ball Socket Ring Clip
74 Outside Telescopic Member
75 Telescopic Locking Member
76 Second Ball Socket Ring Clip
77 Inside Telescopic Member
81 Clamp
82 First Telescopic Locking Part
83 Second Telescopic Locking Part
84 Adapter Gear
88 Tablet Holder

DETAILED DESCRIPTION OF THE PREFERRED EMBODIMENTS

The present invention generally has a pair of ball sockets and a telescopic function that can be loosened for adjustment and then tightened for usage. A single lever can secure both ball sockets as well as the telescopic slider portion. The lever can be in the shape of a rod handle, or in the shape of a rotating grip ring that does not have substantial protrusion.

A first ball socket 20 is located on an end of the main body 70 and opposing a second ball socket 30. The first ball socket 20 includes a first ball 21 having a rounded first ball surface 22 that is held within a first ball socket cavity 27. The first ball surface 22 extends to a first ball extension flange 23 that has a first ball extension opening 24. The first ball extension flange 23 extends outward from the first ball extension shaft 25. The first ball 21 has a first ball contact 26 where the first ball abuts the first ball locking rod 40.

Similarly, the second ball socket 30 has a second ball 31 held within a second ball socket cavity 37. The second ball has a second ball external surface 32 that extends to a second ball extension flange 33 at a second ball extension shaft 35. The second ball extension opening 34 is formed on the second ball extension flange and can be adapted to secure to other connections. The second ball socket also has a second ball contact 36.

The second ball cavity 37 optionally includes a second ball socket plate 38 and a second ball socket plate spring 39. The second ball socket plate 38 can be mounted to the second ball plate spring 39 so that a biasing resilient force can be provided for the second ball contact 36. The second ball socket plate spring 39 can be formed as a leaf spring or as a coil spring. The biasing resilient force presses the second ball 31 against the second ball socket retaining clip 76. The second ball socket retaining clip 76 retains the second ball 31 inside the second ball socket.

Similarly, a first ball 21 can be retained within the first ball socket 20 with a first ball socket ring clip 73. The first ball socket ring clip can be a wire that is shaped to conform to the inside of a groove and then mounted to the inside surface of the first ball socket cavity 27.

The first ball locking rod 40 is threaded to the first ball socket base 41 in a right-handed threading orientation or a left-handed threading orientation. The first ball socket base 41 retains the first ball locking rod 40 in a threaded screw configuration so that turning the first ball locking rod 40 relative to the first ball socket base allows tightening and loosening of the first ball contact 26. The first ball socket base 41 forms a base of the first ball socket cavity 27. The first ball locking rod has first ball locking rod thread 42 that is matched and engages with the first ball socket base thread 44. The threaded connection can be oiled for ease of rotation.

The first ball locking rod 40 has a shaft cavity 43 that receives the shaft cavity key 53 of the second ball locking rod 50. The shaft cavity key 53 slides along the shaft cavity 43. When the first ball locking rod 40 is rotated, the rotation is transferred to the second ball locking rod 50 by the shaft cavity key 53. The shaft cavity key 53 has a cross-section that is not round so that the external surface of the shaft cavity key 53 can transfer rotation to the internal surface of the shaft cavity 43. The first ball locking rod 40 can be configured to receive rotation. The rotation is of the second ball locking rod 50 can turn the shaft cavity key 53. Motion can be reciprocally transferred.

The second ball locking rod 50 is in threaded connection with the second ball socket base 51. The second ball socket base 51 forms a surface of the second ball socket cavity 37. The second ball socket base 51 is rigidly connected to the main body 70. The first ball socket base 41 is connected to the inside telescopic member 77 while the second ball socket base 51 is connected to the outside telescopic member 74.

The main body 70 has a main body surface 71 that can be cylindrical. The main body surface 71 can extend to a telescopic connection 72. The inside telescopic member 77 as a telescopic connection 72 with the outside telescopic member 74.

As the locking lever 60 is rotated by the user, the locking lever leaves a locking lever depression 62. A user can grasp the locking lever tip 61 using a tip of a finger. The locking lever tip 61 can be bent. The locking lever tip is mounted to the locking lever shaft 63. When the locking lever is turned, the turning force turns the second ball locking rod 50. The second ball locking rod 50 has a shaft cavity key 53 that turns the first ball locking rod 40. When the second ball socket base thread 54 and the first ball socket base thread 44 have opposite orientations, the locking lever will lock both of the balls so that the balls do not move. The telescopic connection 72 can also be locked in the same single motion of the locking lever 60. The single motion that turns the locking lever 60 also engages a telescopic locking member 75 so that the telescopic connection 72 does not have play. The telescopic connection 72 can have a ridged exterior surface of the inside telescopic member that fixes and engages to a ridged interior surface of the outside telescopic member 74 when the telescopic locking member 75 is engaged. The telescopic locking member 75 is attached to the inside telescopic member 77 so that the inside telescopic member 77 can engage the outside telescopic member 74.

The telescopic connection 72 is therefore rigid and not moving when the locking lever is in locked position, but can be moved when the locking lever is in a released position. The locking lever selectively activates the telescopic locking member 75 while simultaneously activating the first ball contact 26 and the second ball contact 36. The telescopic locking member 75 may have a first telescopic locking part 82 and a second telescopic locking part 83. The first telescopic locking part 82 and the second telescopic locking part 83 can be mounted to each other so that rotation of the shaft cavity key 53 relative to the telescopic locking member moves the first telescopic locking part 82 and the second telescopic locking part 83. Either one or both of pair of telescopic locking parts, namely the first telescopic locking part 82 and/or the second telescopic locking part 83, can be biased against an internal sidewall of the outside telescopic member 74 when the locking lever is in locked position. If the internal sidewall of the outside telescopic member 74 is ridged, the telescopic locking member 75 may have parts that can engage the ridged profile of the internal sidewall of the outside telescopic member 74.

The locking lever 60 can be formed as an annular ring having an exterior grip profiled surface. An annular ring may have ergonomic difficulties, but these difficulties can be mitigated using an adapter gear. The locking lever 60 can engage an adapter gear 84 to assist in the turning of the shaft cavity key 53 using a mechanical advantage conferred by the adapter gear 84. Alternatively, the exterior grip profiled surface can be modified for improved grip. A clamp 81 can be connected to the outside telescopic member 74, and a tablet holder 88 can be connected to the inside telescopic member 77. The tablet holder 88 can hold a personal electronic device.

The invention claimed is:

1. A double ball joint locking device comprising:
   a. a first ball socket mounted to a first telescopic member, wherein the first ball socket has a first ball;
   b. a second ball socket mounted to a second telescopic member, wherein the second ball socket has a second ball, wherein the first telescopic member has a telescopic connection with the second telescopic member such that the length of the double ball joint locking device is adjustable;
   c. a first ball locking rod threadedly mounted to a first ball socket base at a first threaded mounting;
   d. a second ball locking rod threadedly mounted to a second ball socket base, at a second threaded mounting, wherein the second threaded mounting has an opposite handed orientation to the first threaded mounting;
   e. a first ball locking rod to second ball locking rod connection that glidingly connects the first ball locking rod to the second ball locking rod, wherein the first ball locking rod is configured to transmit and receive rotation with the second ball locking rod; and
   f. a locking lever mounted to either the first ball locking rod or the second ball locking rod, wherein the locking lever has a lock position and an open position.

2. The double ball joint locking device of claim 1, further comprising: a tablet holder connected to a first ball extension shaft formed on the first ball.

3. The double ball joint locking device of claim 1, further comprising: a clamp connected to a second ball extension shaft formed on the second ball.

4. The double ball joint locking device of claim 1, further comprising: a first ball contact where the first ball abuts the first ball locking rod and a second ball contact where the second ball abuts the second ball locking rod.

5. The double ball joint locking device of claim 1, further comprising a locking lever that is held in a locking lever depression when the locking lever is in the locked position, wherein a locking lever tip is mounted to a locking lever shaft.

6. The double ball joint locking device of claim 1, further comprising: a first ball contact wherein the first ball abuts the first ball locking rod and a second ball contact wherein the second ball abuts the second ball locking rod.

7. The double ball joint locking device of claim 1, further comprising: a tablet holder connected to a first ball extension shaft formed on the first ball.

8. The double ball joint locking device of claim 1, further comprising: a clamp connected to a second ball extension shaft formed on the second ball.

9. The double ball joint locking device of claim 1, further comprising: a first ball contact where the first ball abuts the first ball locking rod and a second ball contact where the second ball abuts the second ball locking rod.

10. The double ball joint locking device of claim 1, further comprising a locking lever that is held in a locking lever depression when the locking lever is in the locked position, wherein a locking lever tip is mounted to a locking lever shaft.

11. The double ball joint locking device of claim 1, further comprising: a first ball contact wherein the first ball abuts the first ball locking rod and a second ball contact wherein the second ball abuts the second ball locking rod.

12. A double ball joint locking device comprising:
   a. a first ball socket mounted on a main body, wherein the main body is formed as a tube, wherein the first ball socket has a first ball;
   b. a second ball socket, wherein the second ball socket has a second ball;
   c. a first ball locking rod threadedly mounted to a first ball socket base at a first threaded mounting;
   d. a second ball locking rod threadedly mounted to a second ball socket base, at a second threaded mounting, wherein the second threaded mounting has an opposite handed orientation to the first threaded mounting;
   e. a first ball locking rod to second ball locking rod connection that glidingly connects the first ball locking rod to the second ball locking rod, wherein the first ball locking rod is configured to transmit and receive rotation with the second ball locking rod; and
   f. a locking lever mounted to either the first ball locking rod or the second ball locking rod, wherein the locking lever has a lock position and an open position.

13. The double ball joint locking device of claim 12, further comprising: a tablet holder connected to a first ball extension shaft formed on the first ball.

14. The double ball joint locking device of claim 12, further comprising: a clamp connected to a second ball extension shaft formed on the second ball.

15. The double ball joint locking device of claim 12, further comprising: a first ball contact where the first ball abuts the first ball locking rod and a second ball contact where the second ball abuts the second ball locking rod.

16. The double ball joint locking device of claim 12, further comprising a locking lever that is held in a locking lever depression when the locking lever is in the locked position, wherein a locking lever tip is mounted to a locking lever shaft.

17. The double ball joint locking device of claim 12, further comprising: a first ball contact wherein the first ball abuts the first ball locking rod and a second ball contact wherein the second ball abuts the second ball locking rod.

* * * * *